(12) United States Patent
Liu et al.

(10) Patent No.: US 8,812,198 B1
(45) Date of Patent: Aug. 19, 2014

(54) DOCKING ASSISTANCE AND DISPLAY SYSTEM

(71) Applicant: Caterpillar Inc., Peoria, IL (US)

(72) Inventors: Hong Liu, Peoria, IL (US); Brian G. Funke, Peoria, IL (US); Mathew Chacko, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/854,994

(22) Filed: Apr. 2, 2013

(51) Int. Cl.
*G06F 7/70* (2006.01)

(52) U.S. Cl.
USPC .......................................................... 701/50

(58) Field of Classification Search
None
See application file for complete search history.

(56) References Cited

U.S. PATENT DOCUMENTS

| 6,114,993 | A | 9/2000 | Henderson et al. |
| 6,134,493 | A | 10/2000 | Kaneko |
| 6,226,573 | B1 | 5/2001 | Okawa et al. |
| 2009/0131151 | A1* | 5/2009 | Harris et al. .................... 463/22 |
| 2010/0198466 | A1 | 8/2010 | Eklund et al. |
| 2011/0046775 | A1* | 2/2011 | Bailey et al. .................. 700/224 |

FOREIGN PATENT DOCUMENTS

WO 2011090093 7/2011

* cited by examiner

*Primary Examiner* — Thomas Tarcza
*Assistant Examiner* — Adam Alharbi (57) ABSTRACT

A system for assisting in docking of a machine at a loading location is provided. The system includes a first controller and a second controller. The first controller is configured to generate a list of loading locations associated with one or more loading machines. The second controller is communicably coupled to the first controller, a position detection unit and a display unit. The second controller is configured to receive the list of loading locations, receive a signal indicative of a current position of the machine, display a subset of the list of loading locations, select a target loading location from the subset of the list of loading locations based on a relative distance between the current position of the machine and each of the loading locations and display a zoomed in top view of the current position of the machine and the target loading location, based on the selection.

16 Claims, 6 Drawing Sheets

DOCKING ASSISTANCE AND DISPLAY SYSTEM

TECHNICAL FIELD

The present disclosure relates to a docking assistance system, and more specifically for providing assistance to an operator for docking a machine on a worksite.

BACKGROUND

During loading of material from a loading machine onto a transportation machine like a truck, the truck needs to be docked in an appropriate loading position to ensure proper loading of the material. Usually, a loading machine operator may indicate to a truck operator the loading position at which the truck needs to reach by holding an implement of the loading machine approximately above the loading location. The truck operator then visually judges how to maneuver the truck to reach the loading location positioned approximately below the implement of the loading machine. In this process, sometimes the truck operator is not consistently able to dock the truck at the desired loading location. This may lead to a long truck spotting time and also increase in loading machine waiting time, resulting in an overall low loading efficiency.

U.S. Pat. No. 6,114,993 discloses a method for determining and displaying a correlated position of a truck as it is being loaded by an earth moving machine having a bucket. The method receives a loading signal event signal. The method then determines the correlated position of the truck in response to the loading event signal. The correlated position includes an orientation of the truck. The method further displays the correlated position of the truck relative to a land site.

SUMMARY OF THE DISCLOSURE

In one aspect of the present disclosure, a system for assisting in docking of a machine at a loading location is provided. The system includes a first controller and a second controller. The first controller is configured to generate a list of loading locations associated with one or more loading machines. The second controller is communicably coupled to the first controller, a position detection unit and a display unit. The second controller is configured to receive the list of loading locations, receive a signal indicative of a current position of the machine, display a subset of the list of loading locations, select a target loading location from the subset of the list of loading locations based on a relative distance between the current position of the machine and each of the loading locations and then display a zoomed in top view of the current position of the machine and the target loading location, based on the selection.

In another aspect of the present disclosure, a method for assisting in docking of a machine at a loading location on a worksite is provided. The method receives a list of loading locations associated with one or more loading machines on the worksite. The method receives a signal indicative of a current position of the machine. The method then displays a subset of the list of loading locations. The method then selects a target loading location from the subset of the list of loading locations when the machine is in a reverse gear setting. The selection is based on a relative distance between the current position of the machine and each of the loading locations from the subset of the list of loading locations. Then the method further displays a zoomed in top view of the current position of the machine and the target loading location, based on the selection.

Other features and aspects of this disclosure will be apparent from the following description and the accompanying drawings.

DETAILED DESCRIPTION

Figure 1:
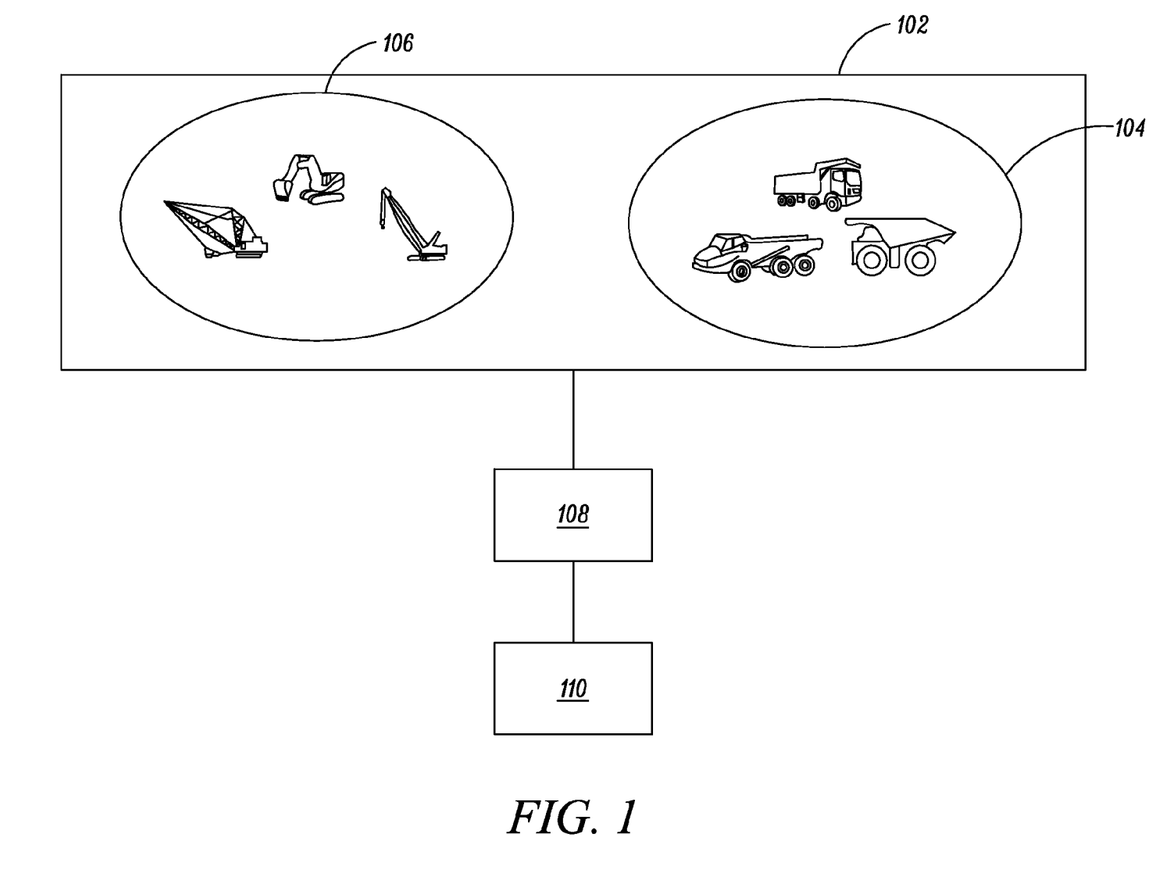
FIG. 1 is an exemplary worksite, according to one embodiment of the present disclosure.

Wherever possible, the same reference numbers will be used throughout the drawings to refer to the same or the like parts. FIG. 1 shows an exemplary worksite 102. A number of different machines 104 configured for transportation of material from one location to another may be deployed on the worksite 102. The machine 104 may be for example, a mining truck, a haul truck, an on-highway truck, an off-highway truck, an articulated truck, and the like. Further, a number of different loading machines 106 may also be deployed on the worksite 102. The loading machine 106 is configured to load the material on the machine 104. The type of loading machines 106 may include, for example, a conveyor, a large wheel loader, a track-type loader, a shovel, a dragline, a crane or any other loading machine known to one skilled in the art.

In one embodiment, the machine 104 and the loading machine 106 may be communicably coupled to each other via a communication system 108. In another embodiment, the machine 104 and the loading machine 106 may be communicably coupled to a remote control station 110 via the communication system 108. Typically, the remote control station 110 may be located off-worksite 102. The remote control station 110 may enable remote monitoring and/or controlling of various functions related to the operation of the loading machine 106 and/or the machine 104 deployed on the worksite 102.

The communication system 108 may be, but not limited to, a wide area network (WAN), a local area network (LAN), an Ethernet, an Internet, an Intranet, a cellular network, a satellite network, or any other suitable network for transmitting data between the machine 104, the loading machine 106 and/or the remote control station 110. In various embodiments, the communication system 108 may include a combination of two or more of the aforementioned networks and/or other types of networks known in the art. The communication system 108 may be implemented as a wired network, a wireless network or a combination thereof. Further, data transmission between the machine 104, the loading machine 106 and the remote control station 110 may occur over the communication system 108 in an encrypted, any other secure format, or in any of a wide variety of known manners.

Figure 2:
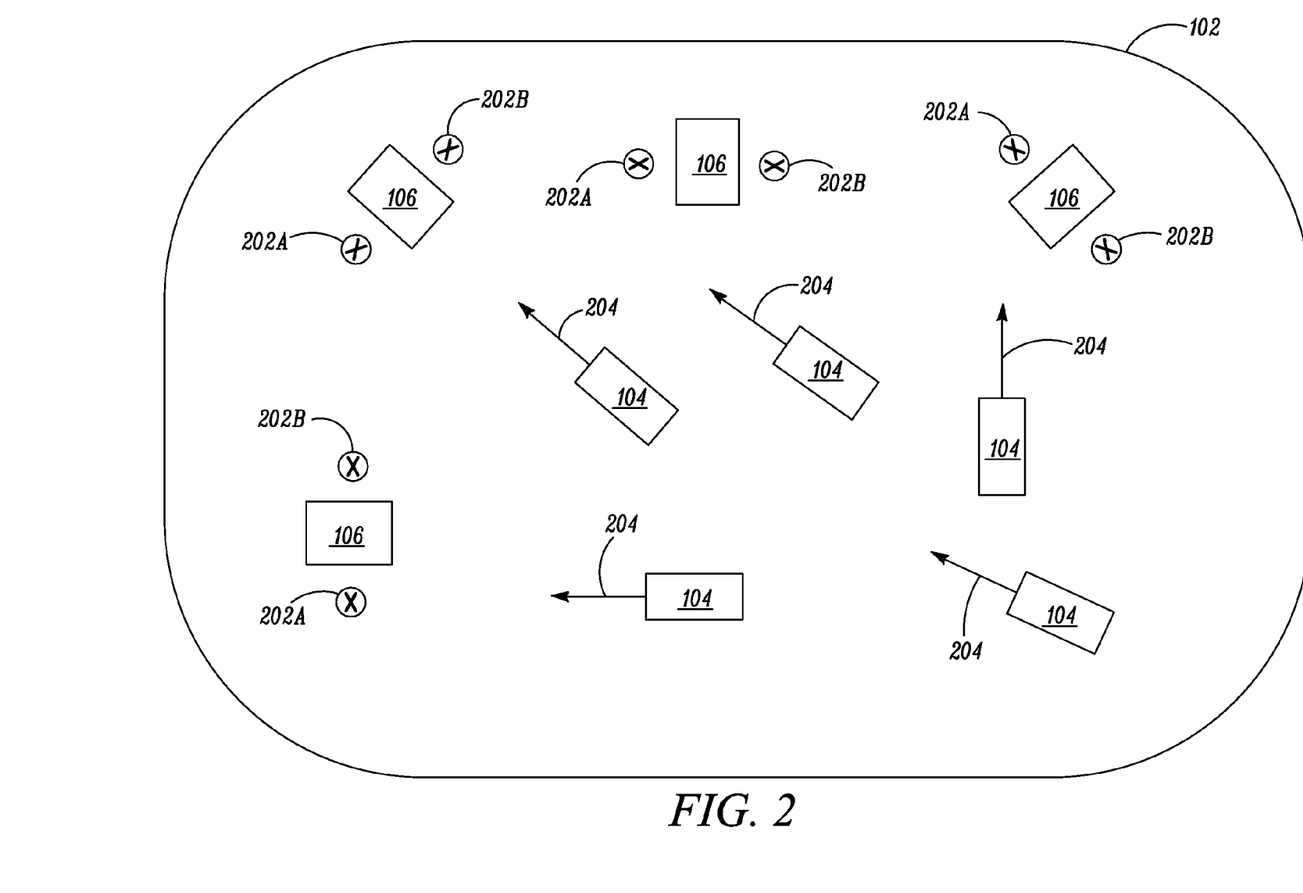
FIG. 2 is a diagrammatic view of a part of the worksite having multiple loading machines with associated loading locations and multiple machines.

FIG. 2 illustrates an overhead diagrammatic view of a part of the worksite 102 having the plurality of loading machines 106 and machines 104. The loading machines 106 are capable of movement on the worksite 102. Once the loading machines 106 are parked or docked at their respective positions on the worksite 102, one or more loading locations 202A, 202B may be associated with each of the loading machines 106. The loading locations 202A, 202B are indicative of the position at which the machines 104 need to be maneuvered in order for the loading machines 106 to load the material onto the machines 104. In the exemplary situation shown in FIG. 2, two loading locations 202A, 202B are provided on either side of each of the loading machines 106. It should be noted that this is merely an exemplary scenario.

Typically, the loading locations 202A, 202B may be provided proximate to the respective loading machine 106 based on possible positions of a linkage assembly (not shown) of the loading machine 106. More specifically, since the linkage assembly is capable of movement in an arcuate manner with different lengths of extension of a lift arm, the loading locations 202A, 202B may be positioned at different distances on either side of the loading machine 106, based on the extension of the lift arm. As shown in the accompanying figure one or more loading locations 202A, 202B, may be associated with the loading machine 106, such that each of the loading locations 202A, 202B may be equidistant from the loading machine 106 or may be located at varying distances from the loading machine 106. Once the loading locations 202A, 202B associated with each of the loading machines 106 are established, the machines 104 may move towards the loading locations 202A, 202B for loading of the material. The arrowheads 204 in FIG. 2 indicate a direction of movement of each of the machines 104 on the worksite 102.

The present disclosure relates to a docking assistance system 300 (shown in FIG. 3) which may be configured to assist in the docking of the machine 104 in the loading location 106. More specifically the docking assistance system 300 may include a first controller 302 located off-board the machine 104. In one embodiment, the first controller 302 may be located at the remote control station 110. The first controller 302 may be configured to generate a list of loading locations 202A, 202B associated with the one or more loading machines 106 on the worksite 102.

Figure 3:
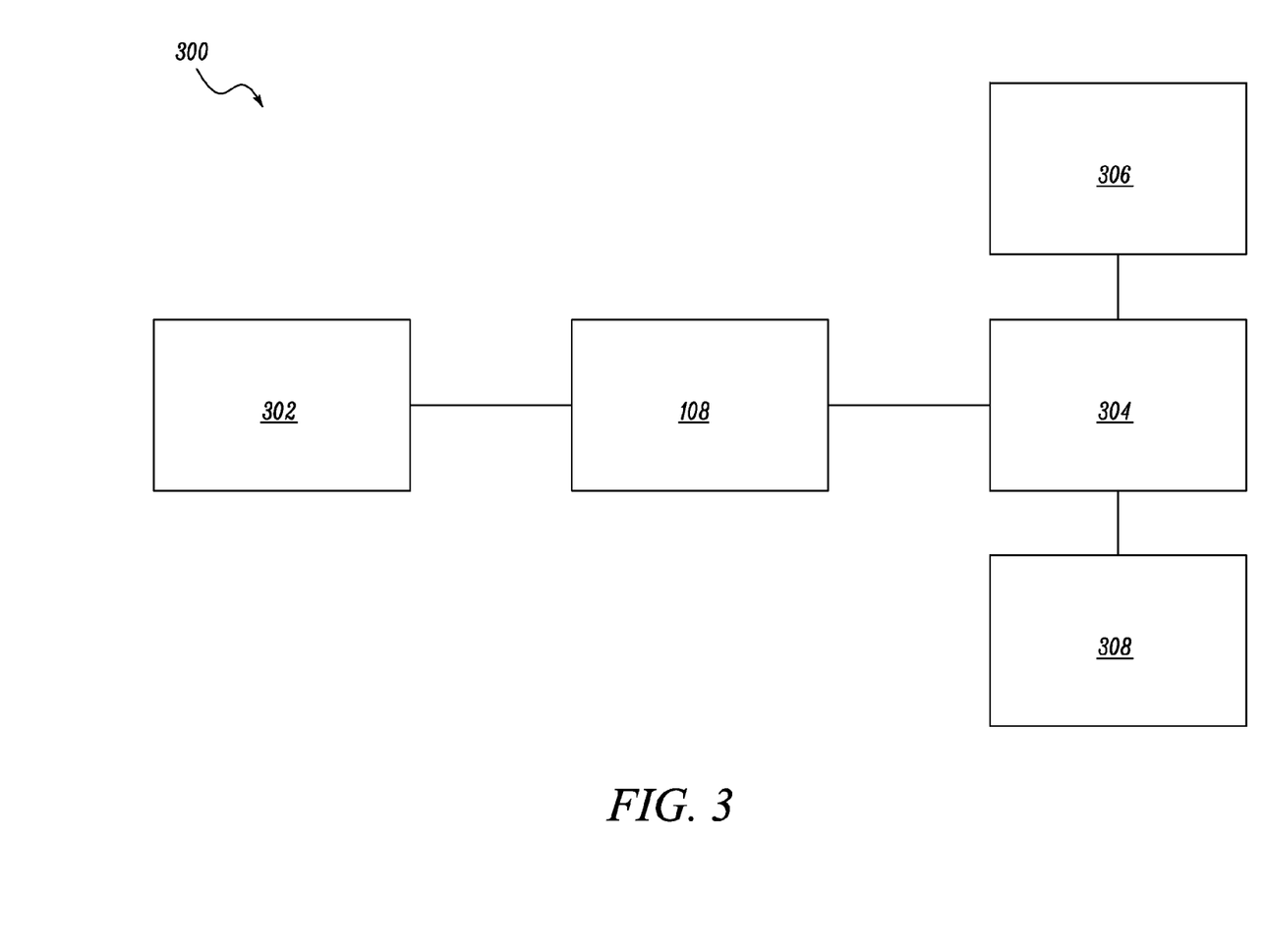
FIG. 3 is a block diagram of a docking assistance system.

The list of loading locations 202A, 202B may be generated by the first controller 302 based on a variety of methods. In one exemplary embodiment, each of the loading machines 106 may be provided with an on-board position determination system (not shown) in order to determine a current position of the respective loading machine 106 on the worksite 102. Further, in the given embodiment, each of the loading machines 106 may also include an implement sensor (not shown) associated with the linkage assembly of the respective loading machine 106. The implement sensor may be any one or a combination of an accelerometer, an inclinometer, a pressure sensor, etc. which is coupled to the linkage assembly of the loading machine 106. The implement sensor may be configured to generate a signal indicative of a position of the linkage assembly relative to a frame of the loading machine 106.

The first controller 302 present at the remote control station 110 may receive the signal indicative of the position of each of the loading machines 106 and the position of the linkage assemblies of the respective loading machines 106 via the communication system 108. Accordingly, based on the received signals, the first controller 302 may be configured to determine the one or more loading locations 202A, 202B associated with each of the loading machines 106. Alternatively, based on the received signals, a site supervisor present at the remote control station 110 may manually identify the one or more loading locations 202A, 202B associated with each of the loading machines 106 and feed the identified loading locations 202A, 202B into the first controller 302 using an operator input device. It should be noted that the first controller 302 may also determine or identify the loading locations 202A, 202B by other methods known in the art.

Further, the first controller 302 may be configured to collate information associated with the plurality of loading machines 106 and correspondingly generate a list of loading locations 202A, 202B associated with the one or more loading machines 106 present on the worksite 102. It should be noted that the list of loading locations 202A, 202B may be updated on a real-time or periodic basis, based on the application and system requirements.

Referring to FIG. 3, the docking assistance system 300 may further include a second controller 304 which is located on-board the machine 104. The second controller 304 may be configured to receive the list of loading locations 202A, 202B from the first controller 302 via the communication system 108. The second controller 304 may further be communicably coupled to a position detection unit 306 located on the machine 104. The position detection unit 306 may be configured to generate a signal indicative of a current position of the machine 104. The position detection unit 306 may be any one or a combination of a Global Positioning System, a Global Navigation Satellite System, a Pseudolite/Pseudo-Satellite, any other Satellite Navigation System, an Inertial Navigation System or any other known position detection system known in the art. The second controller 304 may receive the signal generated by the position detection unit 306 indicative of the current position of the machine 104.

It should be understood that the list of loading locations 202A, 202B may be indicative of the various spots on the worksite 102 at which the machine 104 may be docked for the loading of the material. However, one of ordinary skill in the art will appreciate that the list of loading locations 202A, 202B received from the first controller 302 may contain certain loading locations which may be unavailable for docking. This may happen if the loading location is already occupied by another machine 104, if the loading machine 106 is currently idle, or a variety of other reasons.

Accordingly, in one embodiment, the second controller 304 may be configured to refine the list of loading locations 202A, 202B by elimination of certain loading locations. Different criteria associated with the machine 104 and the loading locations 202A, 202B may be utilized for the elimination. In one situation, the elimination of one or more loading locations from the list of the loading locations 202A, 202B may be based on one or more parameters associated with the machine 104 and an inactive status associated with the loading location.

The one or more parameters associated with the machine 104 may include, for example, at least one of a speed of the machine 104, a current heading of the machine 104, a steering angle, and/or a transmission gear of the machine 104. Based on the aforementioned parameters, the second controller 304 is configured to make a prediction of the loading locations which may be unfeasible for the machine 104 to reach. The second controller 304 may receive appropriate signals related to the given parameters from different sensors located on-board the machine 104.

Other parameters for the prediction and elimination may also be utilized. For example, the second controller 304 may eliminate the loading location based on a distance between the current position of the machine 104 and the loading location. Loading locations that are relatively far from the current position of the machine 104 may be accordingly eliminated. Further, in some situations, a pre-assigned loading machine 106 may be fixed for the machine 104 from the back end of the system. In such situations, only those loading locations that are associated with the pre-assigned loading machine 106 for the given machine 104 may be retained as a viable loading location from the list of loading locations 202A, 202B by the second controller 304.

Another elimination criterion may include the inactive status associated with the loading location. The inactive status associated with the loading location may be based on at least one of an availability of an operator on-board the corresponding loading machine 106 and/or an occupied condition of the loading location. For example, the availability of the loading machine 106 operator may be determined by detecting an active status of an engine of the loading machine 106, detecting activity of operator controls on-board the loading machine 106, and the like. Further, the occupied condition of the loading location may be determined by detecting a presence of any of the machines 104 in the loading location using signals generated by the respective position detection units 306 located on-board the machine 104, active status of the implement of the loading machine 106 indicating a dump cycle, and the like. This data may be periodically sent to the second controller 304 from the first controller 302 present at the remote control station 110.

Accordingly, the second controller 304 may be configured to eliminate one or more loading locations from the list of loading locations 202A, 202B. Further, the second controller 304 may be configured to display a subset of the list of loading locations 202A, 202B on a display unit 308. The display unit 308 is located on-board the machine 104. The display unit 308 may be an LCD device, an LED device, a CRT monitor, a touchscreen device or any other display device known in the art. In one embodiment, the subset of the list of loading locations 202A, 202B may be a complete list of the loading locations received from the first controller 302. Alternatively, in another embodiment, the subset may include those loading locations 202A, 202B that are not eliminated by the second controller 304. The subset of the list of loading locations 202A, 202B may be displayed on the display unit 308 in various ways. For example, a map of the worksite 102 may be displayed showing the position of the loading locations 202A, 202B using appropriate icons. In another example, a drop down text list showing relevant information related to the loading locations 202A, 202B may be displayed. One of ordinary skill in the art will appreciate that these displays may be configurable based on the needs of the operator of the machine 104.

More specifically, the present disclosure relates to displaying a zoomed in top view of the machine 104 and a target loading location to allow for ease of docking. The target loading location is a term used herein to define the loading location from the subset of the list of loading locations 202A, 202B at which the machine will be docked. This target loading location may either be determined automatically by the second controller 304, or manually based on inputs received from the operator of the machine 104. It should be understood that the identification of the target loading location is important in order to avoid frequent, unnecessary or undesired zoom-in of the display when the machine 104 passes by other loading locations on the worksite 102.

In one embodiment, the second controller 304 may be configured to select the target loading location from the subset of the list of loading locations 202A, 202B. The selection of the target loading location may be based on engagement status of a reverse gear of the machine 104 and on a relative distance between the current position of the machine 104 and each of the loading locations from the subset of the list of loading locations 202A, 202B. It should be noted that when the machine 104 is in the reverse gear transmission mode, it may indicate that the machine 104 is backing up to one of the loading locations 202A, 202B for the loading operation, namely the target loading location. Also, the relative distance between the current position of the machine 104 and the loading locations 202A, 202B may be used to provide an improved refinement criterion. For example, if two possible loading locations lie in a line of a reverse movement of the machine 104, then the loading location which is relatively closer to the current position of the machine 104 may be selected as the target loading location.

As mentioned earlier, in another embodiment, the target loading location may be communicated to the second controller 304 by a user command provided by the operator of the machine 104. In this situation, an operator input device may be provided within an operator cabin of the machine 104 and communicably coupled to the second controller 304. The operator input device may be a touchscreen device employing onscreen buttons and/or a type of an alphanumerical keyboard configured to receive input in the form of touch gestures. Alternatively, the operator input device may include a control panel including buttons, switches, keypads, and like to receive the input from the operator of the machine 104.

Figure 4:
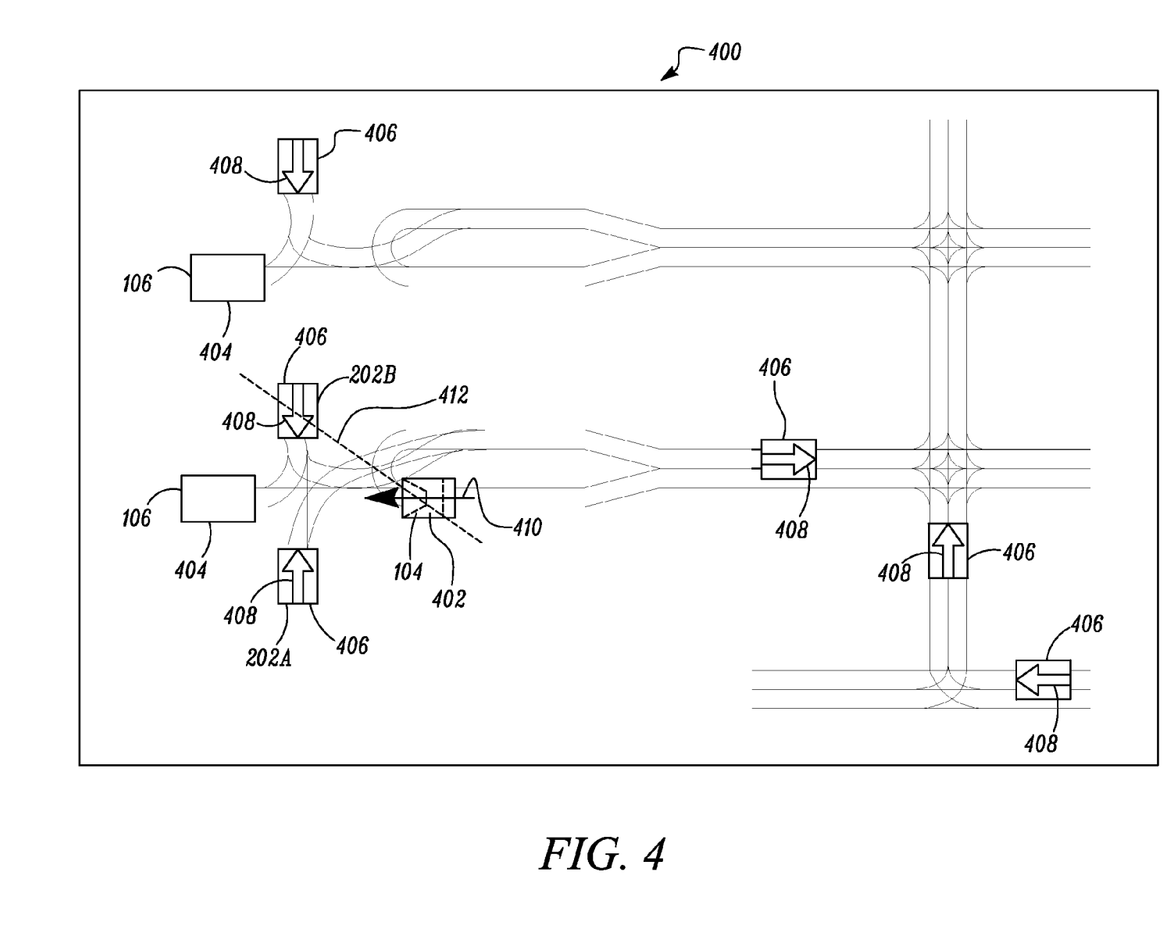
FIGS. 4 and 5 are exemplary displays of the docking assistance system.
Figure 5:
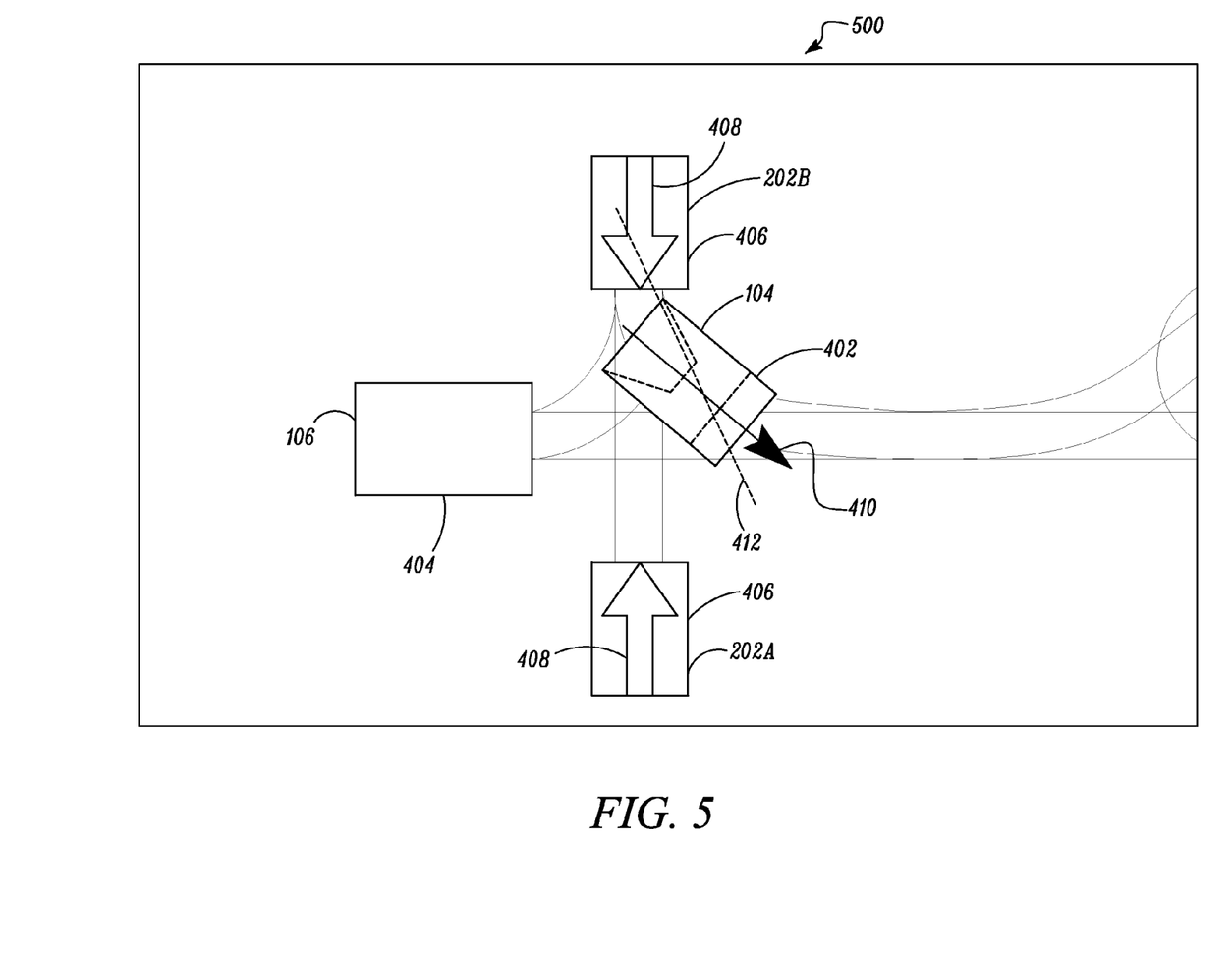

Based on the selection or identification of the target loading location, the second controller 304 may be configured to display the zoomed-in top view of the machine 104 on the worksite 102 and the target loading location on the display unit 308 provided on-board the machine 104. In one embodiment, prior to the zoom-in, a top view of the worksite 102 may be displayed on the display unit 308. FIGS. 4 and 5 are exemplary displays 400, 500, showing the top view and the zoomed-in top view respectively, which may be displayed on the display unit 308 on-board the machine 104, in order to assist the operator in the docking of the machine 104 at the target loading location. As shown in the accompanying figures, the displays 400, 500 may include simulated views of the worksite 102. The top view and the zoomed-in top view of the worksite 102 may be simulated with the use of an appropriate algorithm or associated software known in the art.

More specifically, the display 400 may include a first icon 402 representing the current position of the machine 104 on the worksite 102 and multiple second icons 404 representing the positions of the different loading machines 106 on the worksite 102. Further, the one or more loading locations 202A, 202B associated with each of the loading machines may also be represented by appropriate loading location icons 406 on the display 400. Additionally, a first heading indicator 408 and a second heading indicator 410 may be provided on the loading location icons 406 and the first icon 402, respectively. The first heading indicator 408 may be indicative of a fixed orientation of the machine 104 which may be required at the loading location 202A, 202B. The second heading indicator 410 may be indicative of a current orientation of the machine 104.

FIG. 5 is the display 500 showing the zoomed-in top view of the display 400 shown in FIG. 4. As described earlier, the zoomed-in top view may be displayed on the display unit 308 when the machine 104 is backing up into the target loading location 202B. The zoomed-in top view may show an enlarged view of the current position of the machine 104 and the target loading location 202B using the respective icons 402, 406.

As shown in FIG. 5, a distance indicator 412 may be provided connecting the target loading location icon 406 and the first icon 402 which may be an indication of approaching the target loading location 202B. The distance indicator 412 may be indicative of a relative distance between the current position of the machine 104 and the target loading location 202B.

In one embodiment, as the machine 104 moves towards the target loading location 202B, the display 500 may show different levels of zoom-in based on a relative distance between the current position of the machine 104 and the target loading location 202B. For example, when the machine 104 is at a distance of 15 m from the target loading location 202B, the display 500 shows a 25 percent level of zoom-in, whereas, when the machine 104 is at a distance of 10 m from the target loading location 202B, the display 500 shows a 50 percent level of zoom-in. The level of zoom-in may be selected automatically by the docking assistance system 300 based on the relative distance between the current position of the machine 104 and the target loading location 202B. In one embodiment, the level of zoom-in may be manually selected by the operator of the machine 104 via the operator input device. The levels of zoom-in provided by the docking assistance system 300 may be prefixed based on the application.

The second controller 304 may be further configured to provide a visual indication for a good or a bad docking state when the distance indicator 412 and a difference in alignment of the first and second heading indicators 408, 410 are within a predetermined threshold. For example, when the machine 104 may be very close to the target loading location 202B, for example approximately 0.5 m away, and the difference in alignment of the first and second heading indicators 408, 410 is relatively less, for example approximately 5 degrees, the target loading location icon 406 associated with the target loading location 202B may change to green color to indicate the good docking state. When the machine 104 may stop proximate to the target loading location 202B such that the distance of the machine 104 from the target loading location 202B and the difference in alignment of the first and second heading indicators 408, 410 are more than the predetermined threshold, the target loading location icon 406 associated with the target loading location 202B may change to red color to indicate the bad docking state. After a predetermined amount of duration, the zoom-in level may go back to a default level of zoom-in and the color of the target loading location icon 406 may change to a default color.

Further, in one embodiment, additional information to assist in the docking of the machine 104 at the target loading location 202B may be provided. This additional information may include indicators of a distance remaining to be covered, a change in steering angle required for alignment, a suggestive route, etc. for assisting the operator to maneuver the machine 104 to the target loading location 202B on the worksite 102. Also, icons of different color or design schemes may be used to suggest further information to the operator. For example, when the loading location icon 406 is red, it may be an indication to the operator that the loading machine 106 is currently idle since the operator of the loading machine 106 may have stepped out.

The first and/or the second controllers 302, 304 may embody a single microprocessor or multiple microprocessors that includes a means for receiving signals from the components of the docking assistance system 300. Numerous commercially available microprocessors may be configured to perform the functions of the first and/or the second controllers 302, 304. It should be appreciated that the first and/or the second controllers 302, 304 may readily embody a general machine microprocessor capable of controlling numerous machine functions. A person of ordinary skill in the art will appreciate that the first and/or the second controllers 302, 304, may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

Figure 6:
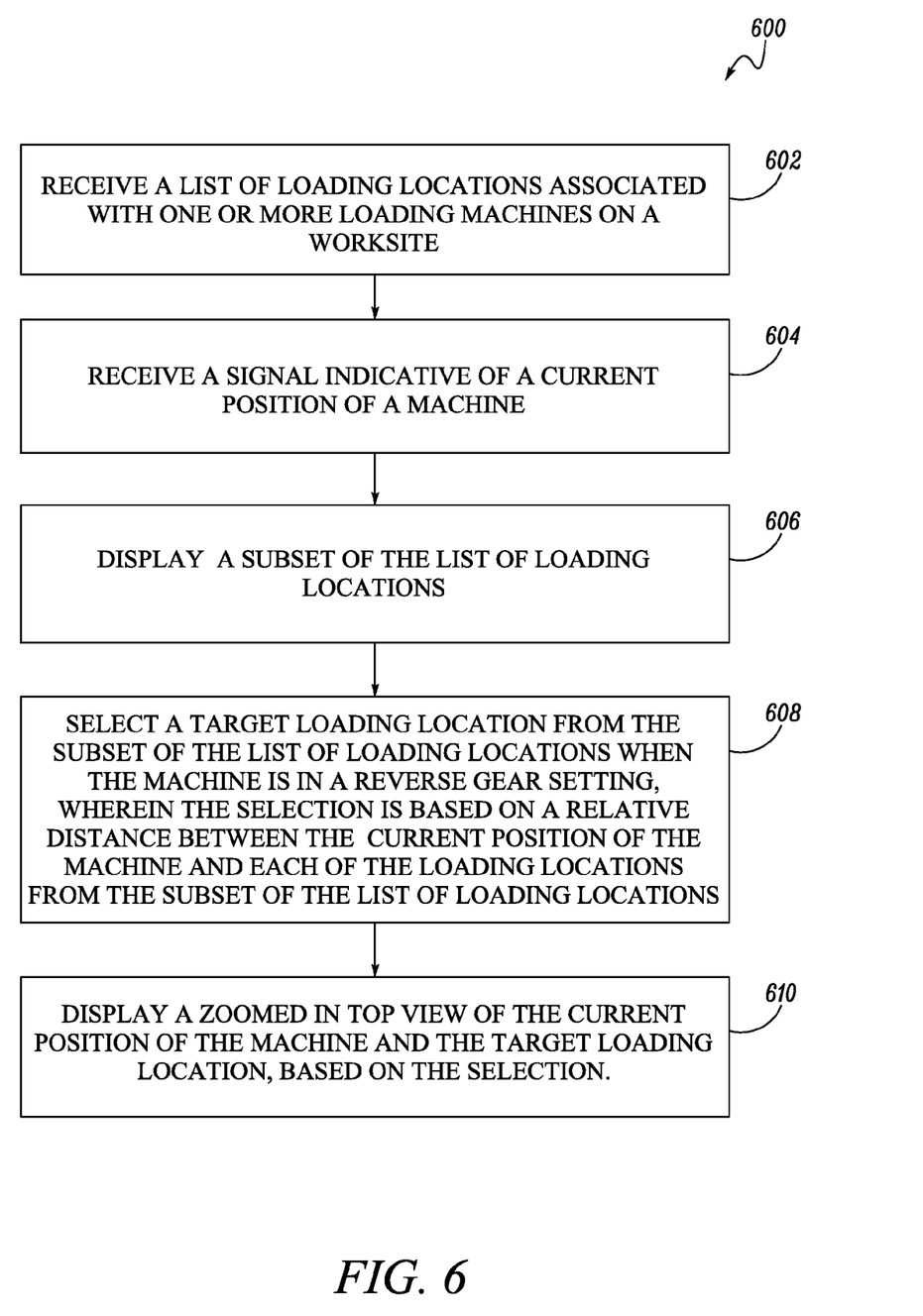
FIG. 6 is a method of operation of the docking assistance system.

Loading operation of the material from a loader onto a transportation machine like a truck requires the truck to be docked in an appropriate loading position to ensure proper loading of the material. Usually, the loader operator assists the truck operator in the docking of the truck by holding an implement of the loader approximately above the loading position. The truck operator then visually judges and maneuvers the truck to the loading position. This process may be inaccurate and time consuming The present disclosure relates to the docking assistance system 300 which may provide an improved method for assisting in docking of the machine 104, leading to a reduction in machine spotting duration and increased efficiency of the material loading process. FIG. 6 depicts a method 600 of operation of the docking assistance system 300. The first controller 302 located in the remote control station 110 may receive signals indicative of the current position of each of the loading machines 106 from the position determination system of the respective loading machine 106. Additionally, the first controller 302 may receive signals indicative of the position of the implement associated with each of the loading machines 106 from the implement sensor on-board the respective loading machine 106. Based on the signals received from the position determination system and the implement sensor associated with each of the loading machines 106, the first controller 302 may generate the list of loading locations 202A, 202B associated with each of the loading machines 106.

At step 602, the second controller 304 located on-board the machine 104 receives the list of loading locations 202A, 202B associated with each of the loading machines 106 on the worksite 102 from the first controller 302. At step 604, the second controller 304 receives the signal indicative of the current position of the machine 104 from the position detection unit 306. Additionally, in one embodiment, the second controller 304 also receives signals indicative of the one or more parameters associated with the machine 104 and the inactive status associated with the loading locations 202A, 202B.

The one or more parameters may be at least one of the speed of the machine 104, the heading of the machine 104, the distance between the current position of the machine 104 and the loading locations 202A, 202B, and a pre-assigned loading machine 106 associated with the machine 104. The inactive status associated with the loading locations 202A, 202B is based on at least one of the availability of the operator on-board the corresponding loading machine 106 and the occupied condition of the loading locations 202A, 202B. Based on these signals, the first controller 302 may eliminate the one or more loading locations from the list of loading locations 202A, 202B. At step 606, the second controller 304 may display the subset of the list of loading locations 202A, 202B on the display unit 308.

At step 608, the target loading location 202B is selected from the subset of the list of loading locations 202A, 202B when the reverse gear of the machine 104 is engaged. The selection of the target loading location 202B is based on the relative distance between the current position of the machine 104 and each of the loading locations from the subset of the list of loading locations 202A, 202B. In one embodiment, the target loading location 202B is selected by the operator of the machine 104 through the operator input device.

At step 610, the display 400 displayed on the display unit 308 may change to the display 500 showing the zoomed in top view of the current position of the machine 104 and the target loading location 202B, based on the selection. The level of zoom-in may be selected automatically by the docking assistance system 300 based on the relative distance between the current position of the machine 104 and the target loading location 202B or may be manually selected by the operator of the machine 104 via the operator input device. The display 500 also displays additional information to assist in the docking of the machine 104 like visual indication to indicate the docking state of the machine 104 at the target loading location 202B, distance remaining to be covered, change in steering angle required for alignment, suggestive route, and other such docking related useful information.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for assisting in docking of a machine at a loading location located on a worksite, the system comprising:
    a first controller located off-board the machine, the first controller configured to generate a list of loading locations associated with one or more loading machines on the work site;
    a position detection unit located on-board the machine, the position detection unit configured to generate a signal indicative of a current position of the machine on the work site;
    a display unit located on-board the machine; and
    a second controller located on-board the machine, the second controller communicably coupled to the first controller, the position detection unit, and the display unit, the second controller configured to:
    receive the list of loading locations;
    receive the signal indicative of the current position of the machine;
    display a subset of the list of loading locations;
    eliminate one or more loading locations from the list of the loading locations based on one or more parameters associated with the machine and an inactive status associated with the loading location, and wherein the one or more parameters include at least one of a speed of the machine, a heading of the machine, a distance between the current position of the machine and the loading location, and a pre-assigned loading machine associated with the machine;
    select a target loading location from the subset of the list of loading locations when the machine is in a reverse gear setting, wherein the selection is based on a relative distance between the current position of the machine and each of the loading locations from the subset of the list of loading locations; and
    display a zoomed in top view of the current position of the machine and the target loading location, based on the selection.

2. The system of claim 1, wherein the first controller is located at a remote control station.

3. The system of claim 1, wherein the inactive status associated with the loading location is based on at least one of an availability of an operator on-board the corresponding loading machine and an occupied condition of the loading location.

4. The system of claim 1, wherein the subset of the list of available loading locations includes a remaining list of the loading locations which are not eliminated.

5. The system of claim 1, wherein the selection of the target loading location is further based on a user command.

6. The system of claim 1, wherein the zoomed in top view further includes a first heading indicator and a second heading indicator, the first heading indicator associated with an orientation of the machine and the second heading indicator associated with a fixed orientation at the target loading location.

7. The system of claim 6, wherein the zoomed in top view further includes a distance indicator indicative of a relative distance between the current position of the machine and the target loading location.

8. The system of claim 7, wherein the second controller is further configured to provide a visual indication when the distance indicator and a difference in alignment of the first heading indicator and the second heading indicator are within a predetermined threshold.

9. The system of claim 1, wherein the display unit is configured to display simulated views.

10. The system of claim 1, wherein the display unit is configured to display a top view of the worksite prior to the zoom-in.

11. The system of claim 1, wherein the second controller is further configured to provide a plurality of zoom-in levels of the top view of the machine on the worksite and the target loading location.

12. A method for assisting in docking of a machine at a loading location on a worksite, the method comprising:
    receiving, by a controller, a list of loading locations associated with one or more loading machines on the worksite;
    receiving a signal indicative of a current position of the machine;
    displaying a subset of the list of loading locations;
    eliminating one or more loading locations from the received list of the loading locations based on one or more parameters associated with the machine and an inactive status associated with the loading location, and wherein the one or more parameters include at least one of a speed of the machine, a heading of the machine, a distance between the current position of the machine and the loading location, and a pre-assigned loading machine associated with the machine;
    selecting a target loading location from the subset of the list of loading locations when the machine is in a reverse gear setting, wherein the selection is based on a relative distance between the current position of the machine and each of the loading locations from the subset of the list of loading locations; and
    displaying a zoomed in top view of the current position of the machine and the target loading location, based on the selection.

13. The method of claim 12, wherein the inactive status associated with the loading location is based on at least one of an availability of an operator on-board the corresponding loading machine and an occupied condition of the loading location.

14. The method of claim 12, wherein the selection of the target loading location is further based on a user command.

15. The method of claim 12 further comprising providing a plurality of zoom-in levels of the top view of the machine on the worksite and the target loading location.

16. A machine operating on a worksite, the machine comprising:
- a position detection unit located on-board the machine, the position detection unit configured to generate a signal indicative of a current position of the machine on the work site;
- a display unit located on-board the machine; and a controller located on-board the machine, the controller communicably coupled to the position detection unit and the display unit, the controller configured to:
- receive a list of loading locations associated with one or more loading machines on the work site;
- receive the signal indicative of the current position of the machine;
- display a subset of the list of loading locations;
- eliminate one or more loading locations from the list of the loading locations based on one or more parameters associated with the machine and an inactive status associated with the loading location, and wherein the one or more parameters include at least one of a speed of the machine, a heading of the machine, a distance between the current position of the machine and the loading location, and a pre-assigned loading machine associated with the machine;
- select a target loading location from the subset of the list of loading locations when the machine is in a reverse gear setting, wherein the selection is based on a relative distance between the current position of the machine and each of the loading locations from the subset of the list of loading locations; and
- display a zoomed in top view of the current position of the machine and the target loading location, based on the selection.

* * * * *